(12) United States Patent
Yu

(10) Patent No.: US 7,576,682 B1
(45) Date of Patent: Aug. 18, 2009

(54) METHOD AND SYSTEM FOR RADAR TARGET DETECTION AND ANGLE ESTIMATION IN THE PRESENCE OF JAMMING

(75) Inventor: Kai Bor Yu, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 191 days.

(21) Appl. No.: 11/375,460

(22) Filed: Mar. 14, 2006

(51) Int. Cl.
*G01S 13/06* (2006.01)

(52) U.S. Cl. .................. 342/90; 342/16; 342/147

(58) Field of Classification Search .......... 342/90
See application file for complete search history.

(56) References Cited

U.S. PATENT DOCUMENTS

| 5,371,506 | A | * | 12/1994 | Yu et al. | 342/380 |
|---|---|---|---|---|---|
| 5,600,326 | A | | 2/1997 | Yu et al. | |
| 5,812,089 | A | * | 9/1998 | Locke | 342/373 |
| 6,084,540 | A | | 7/2000 | Yu | |
| 6,697,009 | B2 | | 2/2004 | Yu | |
| 6,867,726 | B1 | | 3/2005 | Yu et al. | |
| 2001/0048725 | A1 | * | 12/2001 | Hicks et al. | 375/341 |
| 2003/0163046 | A1 | * | 8/2003 | Nohara et al. | 600/443 |
| 2005/0018540 | A1 | * | 1/2005 | Gilbert et al. | 367/138 |

OTHER PUBLICATIONS

Davis et al. "Maximum Likelihood Processing with Digital Beamforming". 2000 IEEE Antennas and Propagation Society International Symposium. vol. 2. Jul. 16-21, 2000. pp. 889-901.*
R. M. Davies and R. L Fante, "A Maximum-Likelihood Beamspace Processor Improved Search and Track," IEEE Transactions of Antennas and Propagation, vol. 49, No. 7 (Jul. 2001).
E. Kelly, I. Reed and W. Root, "The detection of radar echoes in noise II," J. Soc. Ind. Appl. Math, vol. 8, pp. 481-510, Sep. 1960.
E. Baranoski and J. Ward, "Source localization using adaptive subspace beamformer outputs," in 1997 IEEE Conf. Speech Signal Processing (ICASSP 97), vol. 5, pp. 3773-3776.

* cited by examiner

*Primary Examiner*—Thomas H Tarcza
*Assistant Examiner*—Matthew M Barker
(74) *Attorney, Agent, or Firm*—Howard IP Law Group, P.C.

(57) ABSTRACT

A method for radar target detection and angle estimation in the presence of jamming includes the steps of receiving a signal from a radar array having elements arranged in rows and columns; performing deterministic row-based beamforming on the received signal to obtain row sum azimuth beams; performing deterministic column-based beamforming on the received signal to obtain column sum elevation beams; performing one-dimensional maximum likelihood estimation on the row sum azimuth beams to obtain an estimated target elevation angle and an adaptive array sum azimuth beam; performing one-dimensional maximum likelihood estimation on the column sum elevation beams to obtain an estimated target azimuth angle and an adaptive array sum elevation beam; and performing target detection based on the adaptive array sum azimuth beam and the adaptive array sum elevation beam.

18 Claims, 6 Drawing Sheets ns and Propagation, vol. 49, no. 7, July 2001 ("Davis and Fante"). Davis and Fante reduce the computational load required by adaptive processing by performing deterministic beamforming on a small number of beams, such as 4-7 beams. However, this approach does not change the computational burden of the two-dimensional angle search.

METHOD AND SYSTEM FOR RADAR TARGET DETECTION AND ANGLE ESTIMATION IN THE PRESENCE OF JAMMING

STATEMENT REGARDING FEDERALLY SPONSORED RESEARCH OR DEVELOPMENT

The inventions described herein were made in the performance of work under Department of Defense Contract No. 1F3N51SRBAXS.

FIELD OF INVENTION

The present invention relates to radar array technology, and particularly to methods for target detection and angle estimation in the presence of jamming, particularly using maximum likelihood techniques.

BACKGROUND

In processing digital signals received from radar arrays in order to detect targets and estimate target angles, one technique is called the maximum likelihood (ML) procedure, or maximum likelihood estimation. In the ML procedure, a search is performed over all possible angular directions of the target, and selecting a direction that yields a set of beam weights that produces the highest probability of target detection. The ML procedure is an alternative to monopulse processing for determining the angular location of a target. In monopulse processing, the angular location of a target is determined by comparing measurements received by two or more simultaneous beams. In a typical digital beamforming radar, one beam is formed in transmission, and two or more beams are formed on reception for angle measurement. These beams correspond to the sum beam, azimuth difference beam, and elevation difference beam. The sum beam is used in target detection. Once a target is detected, the ratio of the azimuth difference beam over the sum beam is used for estimation of the azimuth angle, and the ratio of the elevation difference beam over the sum beam is used for estimation of the elevation angle.

Monopulse processing is subject to beam shape loss, in which the signal to noise ratio is lower, the farther the target is from the boresight. The ML procedure eliminates beam shape loss in the receive mode. As a result, the ML procedure permits searching over a greater volume of space. Also, the ML procedure supports improved accuracy in angle estimation when compared with monopulse processing.

A disadvantage in prior art methods of use of the ML procedure is the high computational complexity involved in the ML procedure. A direct solution for the location of a target in a two-dimensional array using the ML technique is not computationally tractable in view of the calculation of the adaptive weights of the coefficients, and the searching of angles in a two-dimensional space. Since the searching process does not address the problem of jamming, assignment of adaptive weights to the coefficients is required to perform target detection and angle estimation in the presence of jammers. The covariance matrix for the adaptive weight computation requires a sample size on the order of the array size. The computational complexity of the inverse of the covariance matrix is on the order of the cube of the array size. The search for the two-dimensional angle is also computationally intense, as the search requires a search for all positions within the main beam.

One prior art method for overcoming these problems is disclosed in R. M. Davis and R. L. Fante, "A Maximum-Likelihood Beamspace Processor for Improved Search and Track," IEEE Transactions of Antennas and Propagation, vol. 49, no. 7, July 2001 ("Davis and Fante"). Davis and Fante reduce the computational load required by adaptive processing by performing deterministic beamforming on a small number of beams, such as 4-7 beams. However, this approach does not change the computational burden of the two-dimensional angle search.

It is thus desired to obtain a radar signal processing method and system employing the ML procedure which is not as computationally intensive as prior art methods in at least of process of two-dimensional angle search and calculation of the adaptive weights.

SUMMARY OF THE INVENTION

In one embodiment of the invention, a method for radar target detection and angle estimation in the presence of jamming includes the steps of receiving a signal from a radar array having elements arranged in rows and columns; performing deterministic row-based beamforming on the received signal to obtain row sum azimuth beams; performing deterministic column-based beamforming on the received signal to obtain column sum elevation beams; performing one-dimensional maximum likelihood estimation on the row sum azimuth beams to obtain an estimated target elevation angle and an adaptive array sum azimuth beam; performing one-dimensional maximum likelihood estimation on the column sum elevation beams to obtain an estimated target azimuth angle and an adaptive array sum elevation beam; and performing target detection based on the adaptive array sum azimuth beam and the adaptive array sum elevation beam.

Another embodiment of the invention includes a system for radar target detection and angle estimation in the presence of jamming, having means for performing deterministic row-based beamforming on a signal received from a radar array to obtain row sum azimuth beams; means for performing deterministic column-based beamforming on the received signal to obtain column sum elevation beams; means for performing one-dimensional maximum likelihood estimation on the row sum azimuth beams to obtain an estimated target elevation angle and an adaptive array sum azimuth beam; means for performing one-dimensional maximum likelihood estimation on the column sum elevation beams to obtain an estimated target azimuth angle and an adaptive array sum elevation beam; and means for performing target detection based on the adaptive array sum azimuth beam and the adaptive array sum elevation beam.

A further embodiment of the invention includes a computer-readable medium having stored thereon instructions, the instructions including instructions which, when executed by a processor, cause the processor to implement a method for radar target detection and angle estimation in the presence of jamming, the method including the steps of receiving a signal from a radar array having elements arranged in rows and columns; performing deterministic row-based beamforming on the received signal to obtain row sum azimuth beams; performing deterministic column-based beamforming on the received signal to obtain column sum elevation beams; performing one-dimensional maximum likelihood estimation on the row sum azimuth beams to obtain an estimated target elevation angle and an adaptive array sum azimuth beam; performing one-dimensional maximum likelihood estimation on the column sum elevation beams to obtain an estimated target azimuth angle and an adaptive array sum elevation beam; and performing target detection based on the adaptive array sum azimuth beam and the adaptive array sum elevation beam.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical radar antenna arrays and signal processing systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
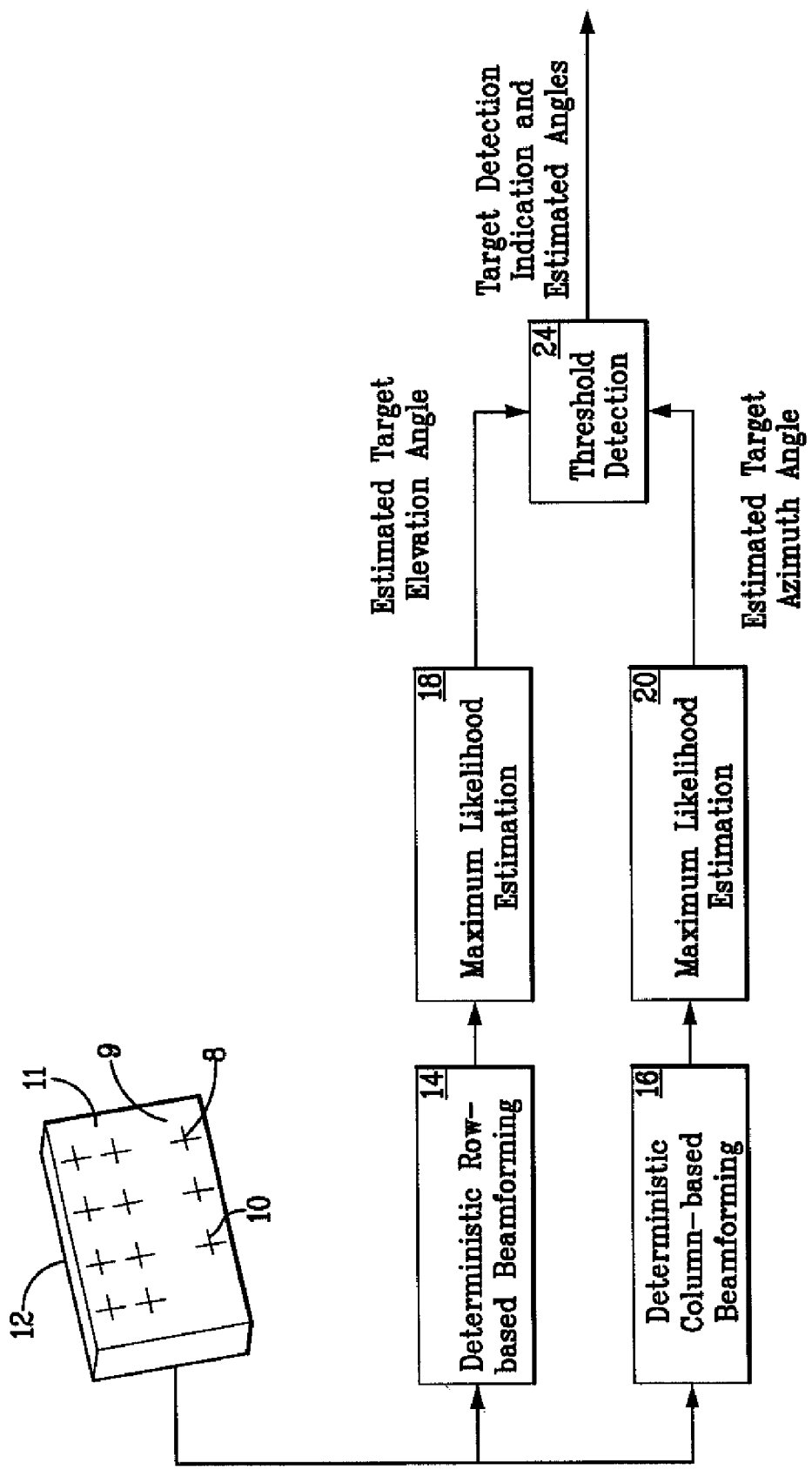
FIG. 1 is a flow diagram of the steps in a method for target detection and angle estimation in accordance with an embodiment of the invention.

Referring now to FIG. 1, a method according to an embodiment of the invention will now be described. A planar radar antenna 12 having a two-dimensional element array 11 is illustrated. The illustrated planar radar antenna 12 has a rectangular array 11 of elements 8, in which a first dimension is made up of rows 9, and a second dimension is made up of columns 10. The rows 9 and columns 10 are orthogonal. However, the principles of the invention may be applied to other two-dimensional element arrays. As one of ordinary skill will immediately recognize, the illustrations of antenna 12 and array 11 in the figures merely communicate the data communication links between array 11 and other components illustrated in the figures, and do not represent the physical orientation of antenna 12 and array 11 relative to any other components or to any reference structure or coordinate system.

Array 11 of radar antenna 12 provides a digital output, which is provided to two digital processing paths. It will be appreciated that all of the processing steps described above are implemented in digital processing. In a first processing path, a deterministic beamforming operation is performed in a first dimension of the two dimensional array. In the illustrated example, deterministic row-based beamforming is performed, as indicated at block 14. The digital signals output from array 11 are also input in a second processing path to a deterministic beamforming process in the second dimension. In the example of FIG. 1, the signals from array 11 are input to a deterministic column-based beamforming process represented by block 16. The output of each deterministic one-dimensional beamforming process is a set of sum beams in the appropriate dimension. In the example of FIG. 1, the output of deterministic row-based beamforming 14 is a set of row sum azimuth beams. Similarly, the output of deterministic column-based beamforming 16 is a set of column sum elevation beams.

Each set of sum beams output by the deterministic one-dimensional beamforming steps 14, 16 is input to a maximum likelihood estimation process. In the example of FIG. 1, the step of maximum likelihood estimation based on the row sum azimuth beams obtained from deterministic one-dimensional beamforming step 14 is illustrated at block 18. Similarly, the output of deterministic column-based beamforming 16 is input to maximum likelihood estimation at block 20.

The outputs of maximum likelihood estimation 18 are an estimated target elevation angle and an adaptive array sum azimuth beam. The output is provided to a threshold detection process, as indicated by block 24. The outputs of maximum likelihood estimation 20 are an estimated target azimuth angle and an adaptive array sum elevation beam. The outputs of maximum likelihood estimation process 20 are provided to a threshold detection process represented by block 24. In the threshold detection process represented by block 24, the maximum of the adaptive array sum elevation beam and the adaptive array sum azimuth beam may be compared to a threshold. If the maximum of the adaptive array sum elevation beam and the adaptive array sum azimuth beam is at least equal to a threshold, then it is understood that a target has been detected. An indication of target detection and the associated elevation and azimuth angles may then be output, as indicated in FIG. 1. The estimated position of the target based on the estimated elevation angle and the estimated azimuth angle may then be displayed, stored in memory, and/or communicated to other devices for further processing.

The step of deterministic beamforming will now be described in greater detail. However, to facilitate an understanding of the invention, background information will now be introduced. A one-dimensional array having M points may be characterized by a sampling grid identified as:

$$\{x_i\}_{i=1}^{M}$$

For such a one-dimensional array, the sum beam pattern $g_\Sigma$ and difference beam pattern $g_\Delta$, both as a function of a directional cosine, are determined by the respective tapering coefficients $\{w_\Sigma(i)\}_{i=1}^{M}, \{w_\Delta(i)\}_{i=1}^{M}$ where the directional cosine is denoted by $T_x$ and $\lambda$ is the wavelength:

$$g_\Sigma(T_x) = \sum_{i=1}^{M} w_\Sigma(i) \exp\left(j\frac{2\pi}{\lambda} T_x x_i\right)$$

$$g_\Delta(T_x) = \sum_{i=1}^{M} w_\Delta(i) \exp\left(j\frac{2\pi}{\lambda} T_x x_i\right)$$

The sum beam pattern given above is a symmetric beam with a maximum at the center, and the difference beam pattern given above is a two-lobed beam with a null at the broadside.

With this background understanding, the patterns given by a planar array can be better understood. A planar rectangular array is referred to as having N rows and M columns, for a total of N×M elements in the array, such as array 11 of FIG. 1. The configuration of elements on a rectangular grid can support product illumination, i.e., obtaining a pattern for an array based on the product of separately determined patterns in the row and column dimensions. As a matter of notation, the (i, j) element means the element at the location lattice $(x_i, y_j)$, that is, at the i-th column and j-th row. The antenna weighting coefficient (also referred to as a tapering coefficient) for the (i, j) element can be denoted by w(i,j):

$$w(i,j) = w_a(i) w_e(j)$$

In other words, the antenna weighting coefficient or tapering coefficient for an element in a rectangular planar array is equal to the product of the azimuth weighting coefficient of the row of the element and the elevation weighting element of the column of the element. This calculation of the weighting coefficients independently is consistent with independent row-based beamforming (RBBF) and column-based beamforming (CBBF). Thus, the weighting coefficients may be calculated by performing RBBF followed by CBBF, or CBBF followed by RBBF.

Figure 2:
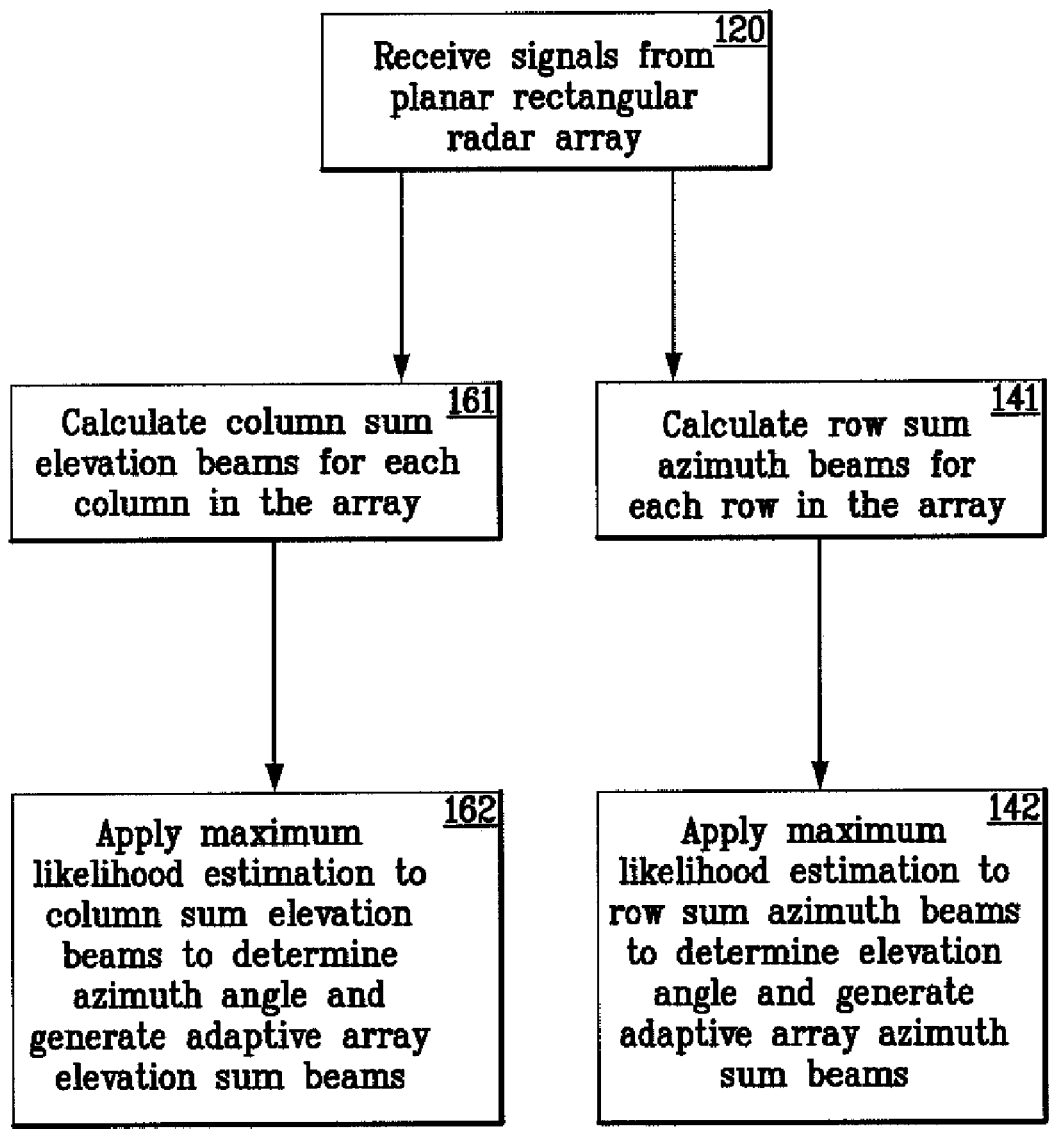
FIG. 2 is a flow diagram showing greater detail of the step of deterministic beamforming followed by maximum likelihood estimation processing in the embodiment of FIG. 1.

The calculations may be summarized by the following beamforming equations on elemental measurements for the element at the i,j position, at time t: $r_{ij}(t)$. Referring to FIG. 2, digital signals are received from a planar rectangular radar array, as indicated at block 120. As indicated at block 141 of FIG. 2, based on the received signals, the row sum azimuth beams are calculated for each row in the array. In these calculations, as is conventional, Taylor weighted coefficients may be used for the sum beams. The Taylor-weighted sum beam coefficients are given by $\{w_{\Sigma_a}(i)\}_{i=1}^{M}$. The row sum azimuth beams are calculated. The sum beams for each row may be calculated by the following equation:

$$r_{\Sigma_o}^{(j)}(t) = \sum_{i=1}^{M} w_{\Sigma_a}(i) r_{ij}(t).$$

Sum beamforming may then be applied to the resulting row sum beams, as indicated at block 142. The result of this beamforming operation provides the following value for the array azimuth sum beam:

$$r_{\Sigma_A}(t) = \sum_{j=1}^{N} w_{\Sigma_e}(j) r_{\Sigma_a}^{(j)}(t)$$

Thus, the foregoing value is obtained as a result of the step in block 14 of FIG. 1.

In a separate branch of a process flow, as indicated at block 16 of FIG. 1, column sum beams are formed in a step of deterministic column-based beamforming. Received data from the array is provided to a step of calculating sum beams for each column in the array, as indicated in FIG. 2 at block 161. The values of column sum beams may be obtained using suitable approximations, such as Taylor sum beam coefficients given by the expression $\{w_{\Sigma_e}(j)\}_{j=1}^{N}$, and the following expressions for sum beams for each column in the array:

$$r_{\Sigma_e}^{(i)}(t) = \sum_{j=1}^{N} w_{\Sigma_e}(j) r_{ij}(t)$$

Maximum likelihood estimation is then applied to the resulting column sum beams for each column in the array, as indicated by block 162 of FIG. 2. The application of maximum likelihood estimation sum beamforming on the above values results in the value below for the sum elevational beam:

$$r_{\Sigma_E}(t) = \sum_{i=1}^{M} w_{\Sigma_a}(i) r_{\Sigma_e}^{(i)}(t)$$

Sum tapering is a linear operation. Accordingly, the results are the same for a process flow having the step of row-based beamforming followed by the step of column-based beamforming and for a process flow having a step of column-based beamforming followed by a step of row-based beamforming.

The terms "quiescent azimuth sum beam" and "quiescent elevation sum beam" may be used to describe sum beams arrived at by the process of deterministic row-based beamforming followed by deterministic column-based beamforming, or deterministic column-based beamforming followed by row-based beamforming. The values of the quiescent array sum azimuth beam and the quiescent array elevation sum beam are the same. Thus the array sum azimuth beam and array sum elevation beam can be denoted just by the array sum beam, i.e.

$$r_\Sigma(t) = r_{\Sigma_A}(t) = r_{\Sigma_E}(t)$$

The beam pattern may be calculated. The beam pattern can be generated by considering the signal at each individual element r as a function of time. The following is the representation for the signal $r_{ij}$ at the (i, j)-th element:

$$r_{ij}(t) = \exp\left( j \frac{2\pi}{\lambda} (T_x x_i + T_y y_j) \right)$$

By tapering with sum beams to the rows and/or columns, the following relationship between the product beam and the azimuth and elevational beams can be calculated:

$$g_\Sigma(T_x, T_y) = \sum_{i=1}^{M} \sum_{j=1}^{N} w(i,j) \exp\left( j \frac{2\pi}{\lambda} (T_x x_i + T_y y_j) \right)$$

$$= \sum_{i=1}^{M} \sum_{j=1}^{N} w_{\Sigma_a}(i) w_{\Sigma_e}(j) \exp\left( j \frac{2\pi}{\lambda} (T_x x_i + T_y y_j) \right)$$

$$= \sum_{i=1}^{M} w_{\Sigma_a}(i) \exp\left( j \frac{2\pi}{\lambda} T_x x_i \right) \sum_{j=1}^{N} w_{\Sigma_e}(j) \exp\left( j \frac{2\pi}{\lambda} T_y y_j \right)$$

$$= g_{\Sigma_a}(T_x) g_{\Sigma_e}(T_y)$$

Thus, the sum beam is equal to the product of the sum azimuth beam and the sum elevation beam. In other words, the sum beam is symmetrical with respect to both azimuth and elevation.

The weighting function may be expressed as follows:

$$w_{\Sigma_A}(i,j) = w_{\Sigma_e}(j) w_{\Sigma_a}(i)$$

$$w_{\Sigma_E}(i,j) = w_{\Sigma_a}(i) w_{\Sigma_e}(j)$$

Thus, the sum azimuth weighting function for the element at (i, j) is the product of the sum elevation weighting function for the jth element and the sum azimuth weighting function for the ith element. Similarly, the sum elevation weighting function for the element at (i, j) is equal to the product of the sum azimuth weighting function for the ith element and the sum elevation weighting function for the jth element.

These weighting functions may be equivalently expressed in terms of Kronecker products or stack matrices, as follows:

$$w_{\Sigma_A} = w_{\Sigma_e} \oplus w_{\Sigma_a} = \begin{bmatrix} w_{\Sigma_e}(1) w_{\Sigma_a} \\ w_{\Sigma_e}(2) w_{\Sigma_a} \\ \vdots \\ w_{\Sigma_e}(N) w_{\Sigma_a} \end{bmatrix}$$

$$w_{\Sigma_E} = w_{\Sigma_a} \otimes w_{\Sigma_e} = \begin{bmatrix} w_{\Sigma_a}(1) w_{\Sigma_e} \\ w_{\Sigma_a}(2) w_{\Sigma_e} \\ \vdots \\ w_{\Sigma_a}(M) w_{\Sigma_e} \end{bmatrix}$$

Once the weighting functions are known, one of ordinary skill in the art may calculate the beam pattern using known techniques.

The step of maximum likelihood estimation on row and column beams, indicated generally in FIG. 1 at blocks 18 and 20, will now be described in detail. Product illumination leads to the separability of the pattern function. Thus partial adaptivity can be introduced easily by two-stage beamforming: deterministic RBBF followed by a maximum likelihood estimation process for estimation of the angle in one dimension, i.e., $T_y$ angle estimation, and target detection, or deterministic CBBF followed by a maximum likelihood estimation process for $T_x$ angle estimation and target detection. In either case, the resulting pattern is a product of the azimuth pattern and the elevation pattern, one of the patterns being deterministic and the other being adaptive with nulls in the directions of the jammers and a peak in the direction of the target signal. This process provides two sum beams, one from azimuth beamforming, and the other from elevation beamforming. These two beams may be combined for improved target detection. The adaptation may be constructed in such a way that the resulting beam pattern is similar to the quiescent beam pattern.

Figure 4A:
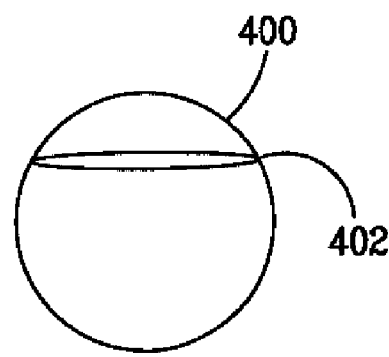
FIGS. 4A, 4B and 4C are schematic diagrams showing the effects of use of a method of the invention on nulls resulting from jamming.
Figure 4B:
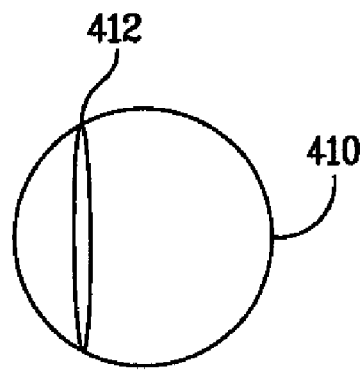
Figure 4C:
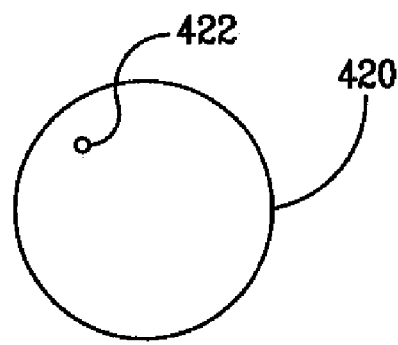

In the presence of a jammer, row-based beam forming results in a horizontal notch in the target field. A somewhat schematic example is shown at FIG. 4A, where 400 is the field resulting from row-based beamforming, and notch 402 represents a horizontal notch caused by a single jammer in the field. In FIG. 4B, the field 410 is the field resulting from column-based beamforming, and notch 412 represents a vertical notch caused by a single jammer in the field. In FIG. 4C, the result of the maximum of the adaptive array sum azimuth beam and the adaptive array sum elevation beam is shown, with a small area 422 representing the jammer location, while targets may be detected in the remainder of field 420 notwithstanding the presence of a jammer.

A signal measurement r at the (i, j) element, that is at the i-th column and j-th row (which may be expressed as location $(x_i, y_j)$), in the presence of one or more jammers, may be expressed as follows:

$$r_{ij}(t) = \exp\left(\frac{2\pi}{\lambda}(T_x^s x_i + T_y^s y_j)\right) s(t) + \sum_{k=1}^{K} \exp\left(\frac{2\pi}{\lambda}(T_x^{(k)} x_i + T_y^{(k)} y_j)\right) J_k(t) + n(i,j)$$

where $(T_x^S, T_y^S), s(t)$ are the directional cosine and the complex amplitude of the target signal; $\{(T_x^{(k)}, T_y^{(k)})\}_{k=1}^{K}$, $\{J_k(t)\}_{k=1}^{K}$ are the set of directional cosines and the set of complex amplitudes of the jammers; and n(i,j) is the noise at the (i, j) element.

Row-based sum beamforming is then applied, using the following weighting formula:

$$r_{\Sigma_a}^{(j)}(t) = \sum_{i=1}^{N} w_{\Sigma_a}(i) r_{ij}(t)$$

To obtain the following expression for the row-based sum beam:

$$r_{\Sigma_a}^{(j)}(t) = g_{\Sigma_a}(T_x^S) \exp\left(\frac{2\pi}{\lambda} T_y^s y_j\right) s(t) + \sum_{k=1}^{K} g_{\Sigma_a}(T_x^k) \exp\left(\frac{2\pi}{\lambda} T_y^{(k)} y_j\right) J_k(t) + n_{\Sigma_a}^{(j)}(t)$$

In the presence of one or more jammers, fully adaptive processing on the row-based sum beams may be performed to minimize the effect of the jamming signal. The adaptive row-based beams may be expressed as follows:

$$\hat{r}_\Sigma(t) = \sum_{j=1}^{M} \hat{w}_{\Sigma_e}^*(j) r_{\Sigma_a}^{(j)}(t)$$

The asterisk corresponds to the complex conjugate and is introduced for convenient vector notation:

$$\hat{r}_{\Sigma_A}(t) = \hat{w}_{\Sigma_e}^H r_{\Sigma_a}(t)$$

where $$\hat{w}_{\Sigma_e} = \begin{bmatrix} \hat{w}_{\Sigma_e}(1) \\ \hat{w}_{\Sigma_e}(2) \\ \vdots \\ \hat{w}_\Sigma(N) \end{bmatrix}$$

$$r_{\Sigma_a}(t) = \begin{bmatrix} r_{\Sigma_a}^{(1)}(t) \\ r_{\Sigma_a}^{(2)}(t) \\ \vdots \\ r_{\Sigma_a}^{(N)}(t) \end{bmatrix}$$

Fully adaptive processing may be performed with the following constraints: (1) minimizing the jamming for RBBF sum beams; (2) using a tapered steering vector for achieving low sidelobes, and (3) maintaining the quiescent search gain for each of the searching directions $T_y^s$. The fully adaptive weight has the following expression:

$$\hat{w}_{\Sigma_e}(T_y^s) = \alpha R_{\Sigma_a \Sigma_a}^{-1} w_{\Sigma_e}(T_y^s)$$

where $$w_{\Sigma_e}(T_y^s) = w_{\Sigma_e} \cdot {}^*e(T_y^s)$$

$R_{\Sigma_a \Sigma_a}$ is the covariance matrix for the row sum beams, $w_{\Sigma_e} \cdot {}^*e(T_y^s)$ corresponds to point-wise multiplication of the two vectors. The estimation of such covariance matrices is well known to those of skill in the art, and is typically accomplished using sample matrix estimates on a number of snapshots. The matrix inverse for the sum beam corresponds to jamming cancellation for the sum beam. The quiescent weights may be expressed as: $\{w_{\Sigma_e}(i)\}_{i=1}^{N}$; these weights may be Taylor coefficients. An advantage of the use of Taylor coefficients is that such coefficients provide for low sidelobe control. The constant $\alpha$ is a normalization constant, which may be selected with a view to the three constraints above. Applying these three constraints leads to the following adaptive weight expression for the row beams:

$$\hat{w}_{\Sigma_e}(T_y^s) = \frac{R_{\Sigma_a \Sigma_a}^{-1} w_{\Sigma_e}(T_y^S)}{w_{\Sigma_e}^H(T_y^S) R_{\Sigma_a \Sigma_a}^{-1} w_{\Sigma_e}(T_y^S)}$$

Similarly, the adaptive weight for the column beams may be expressed as follows:

$$\hat{w}_{\Sigma_a}(T_x^S) = \frac{R_{\Sigma_e \Sigma_e}^{-1} w_{\Sigma_a}(T_x^S)}{w_{\Sigma_a}^H(T_x^S) R_{\Sigma_e \Sigma_e}^{-1} w_{\Sigma_e}(T_x^S)}$$

A computationally efficient algorithm for determining the adaptive weight of the column beams may be constructed based on the QR decomposition of the data matrix. The construction of such algorithms using QR decomposition is well-known to those of skill in the art.

The covariance matrix of the row based sum beams can be expressed in terms of the following:

$$R_{\Sigma_a \Sigma_a} = \frac{1}{K}(X_{\Sigma_a}^H X_{\Sigma_a})$$
$$= \frac{1}{K}(Q_a R_{X_a})^H (Q_a R_{X_a})$$
$$= \frac{1}{K} R_{X_a}^H R_{X_a}$$
$$= \left(\frac{1}{\sqrt{K}} R_{X_a}\right)^H \left(\frac{1}{\sqrt{K}} R_{X_a}\right)$$
$$= L_{X_a} L_{X_a}^H$$

Using the technique of QR decomposition, which is well-known to those of ordinary skill in the art, the weight vector can be expressed as $$\hat{w}_{\Sigma_e}(T_y^S) = \frac{(L_{X_a} L_{X_a}^H)^{-1} w_{\Sigma_e}(T_y^S)}{w_{\Sigma_e}(T_y^S)^H (L_{X_a} L_{X_a}^H)^{-1} w_{\Sigma_e}(T_y^S)}$$
$$= \frac{(L_{X_a}^H)^{-1}[(L_{X_a})^{-1} w_{\Sigma_e}(T_y^S)]}{[w_{\Sigma_e}(T_y^S)^H (L_{X_a}^H)^{-1}][(L_{X_a})^{-1} w_{\Sigma_e}(T_y^S)]}$$
$$= \frac{1}{a_1^H a_1}(L_{X_a}^H)^{-1} a_1$$

where $$a_1 = (L_{X_a})^{-1} w_{\Sigma_e}$$

Similarly for the column based sum beams, the covariance matrix may be expressed as follows:

$$R_{\Sigma_e \Sigma_e} = \frac{1}{K}(X_{\Sigma_e}^H X_{\Sigma_e})$$
$$= \frac{1}{K}(Q_e R_{X_e})^H (Q_e R_{X_e})$$
$$= \frac{1}{K} R_{X_e}^H R_{X_e}$$
$$= \left(\frac{1}{\sqrt{K}} R_{X_e}\right)^H \left(\frac{1}{\sqrt{K}} R_{X_e}\right)$$
$$= L_{X_e} L_{X_e}^H$$

Again using the technique of QR decomposition, which is well-known to those of ordinary skill in the art, the weight vector may be expressed as $$\hat{w}_{\Sigma_a}(T_x^S) = \frac{(L_{X_e} L_{X_e}^H)^{-1} w_{\Sigma_a}(T_x^S)}{w_{\Sigma_a}(T_x^S)^H (L_{X_e} L_{X_e}^H)^{-1} w_{\Sigma_a}(T_x^S)}$$
$$= \frac{(L_{X_e}^H)^{-1}[(L_{X_e})^{-1} w_{\Sigma_a}(T_x^S)]}{[w_{\Sigma_a}(T_x^S)^H (L_{X_e}^H)^{-1}][(L_{X_e})^{-1} w_{\Sigma_a}(T_x^S)]}$$
$$= \frac{1}{a_2^H a_2}(L_{X_e}^H)^{-1} a_2$$

where $$a_2 = (L_{X_e})^{-1} w_{\Sigma_a}$$

Thus, each adaptive weight can be derived using QR decomposition of a data matrix and the solution of two triangular linear systems of equations. This approach involves less computational resources than the use of the inverse of the covariance matrix.

The identification of the testing or candidate elevation angle having the maximum likelihood of being the angle of the target location may be expressed as $$\max |\hat{w}_{\Sigma_e}^H(T_y^S) r_{\Sigma_a}(t)| \Rightarrow \hat{T}_y^S$$

The expression $|\hat{w}_{\Sigma_e}^H(T_y^S) r_{\Sigma_a}(t)|$ is the beamforming output corresponding to testing the directional cosine $T_y^S$ of the elevation angle. Thus the elevation angle having the maximum beamforming weight is the estimated target elevation angle. Since the candidate or testing angles are only in one dimension, the computational resources employed by this calculation are much less than those consumed by two-dimensional maximum likelihood estimation.

This identification of the elevation angle having the maximum beamforming weight may be implemented by using a set of adaptive beamforming weights for each candidate or testing the directional cosine $T_y^S$, of the elevation angle applying adaptive processing using those sets of adaptive beamforming weights to the row-based sum beams, determining the result having the maximum beamforming output, and selecting the elevation angle corresponding to the maximum beamforming output.

Similarly, the identification of the estimated azimuth angle can be conducted by applying a set of adaptive beamforming weights on the output of the column based beamforming step for each of a number of test or candidate directional cosine of the azimuth angle, determining the beamforming output for each test or candidate directional cosine of the azimuth angle, determining the result having the highest beamforming output, and selecting the azimuth angle corresponding to the highest beamforming output. The identification of the estimated azimuth angle may be summarized by the following expression:

$$\max|\hat{w}_{\Sigma_a}^H(T_x^S)r_{\Sigma_e}(t)|\Rightarrow \hat{T}_x^S$$

where the expression $|\hat{w}_{\Sigma_a}^H(T_x^S)r_{\Sigma_e}(t)|$ is the beamforming output corresponding to testing or candidate directional cosine $T_x^S$ of the azimuth angle.

Since the candidate or testing angles are only in one dimension, and the beamforming outputs are calculated over two sets of angles, each in only one dimension, the computational resources employed by the above calculations for identification of the estimated elevation and azimuth angles of the target are much less than those consumed by two-dimensional maximum likelihood estimation.

It will be appreciated that the number of candidate elevation and azimuth angles may be selected by those of ordinary skill in the art depending on the additional complexity in calculation and the desired precision of the estimated target position.

The method of calculation of the estimated angles may be summarized as follows, with reference to FIG. 5. A signal is received from the radar array, as indicated at block 500. In one process flow, the step of performing deterministic row-based beamforming on the received signal, indicated at block 14 of FIG. 1, may include calculating an elevation sum beam for each of the rows in the array, as indicated at block 514 of FIG. 5. The step of maximum likelihood estimation, block 18 of FIG. 1, may include the follow steps. A covariance matrix may be calculated for each row sum beam, as indicated at block 520 of FIG. 5. Based on the covariance matrix, a formula may be determined for the adaptive weight of the row sum beams for each candidate elevation angle, as indicated at block 525 of FIG. 5. Using this formula, the beamforming output may be determined for each candidate elevation angle, as indicated at block 530. The candidate elevation angle corresponding to the maximum beamforming output is then selected, as indicated at block 535. As indicated at block 540, the selected elevation angle is then output.

Figure 5:
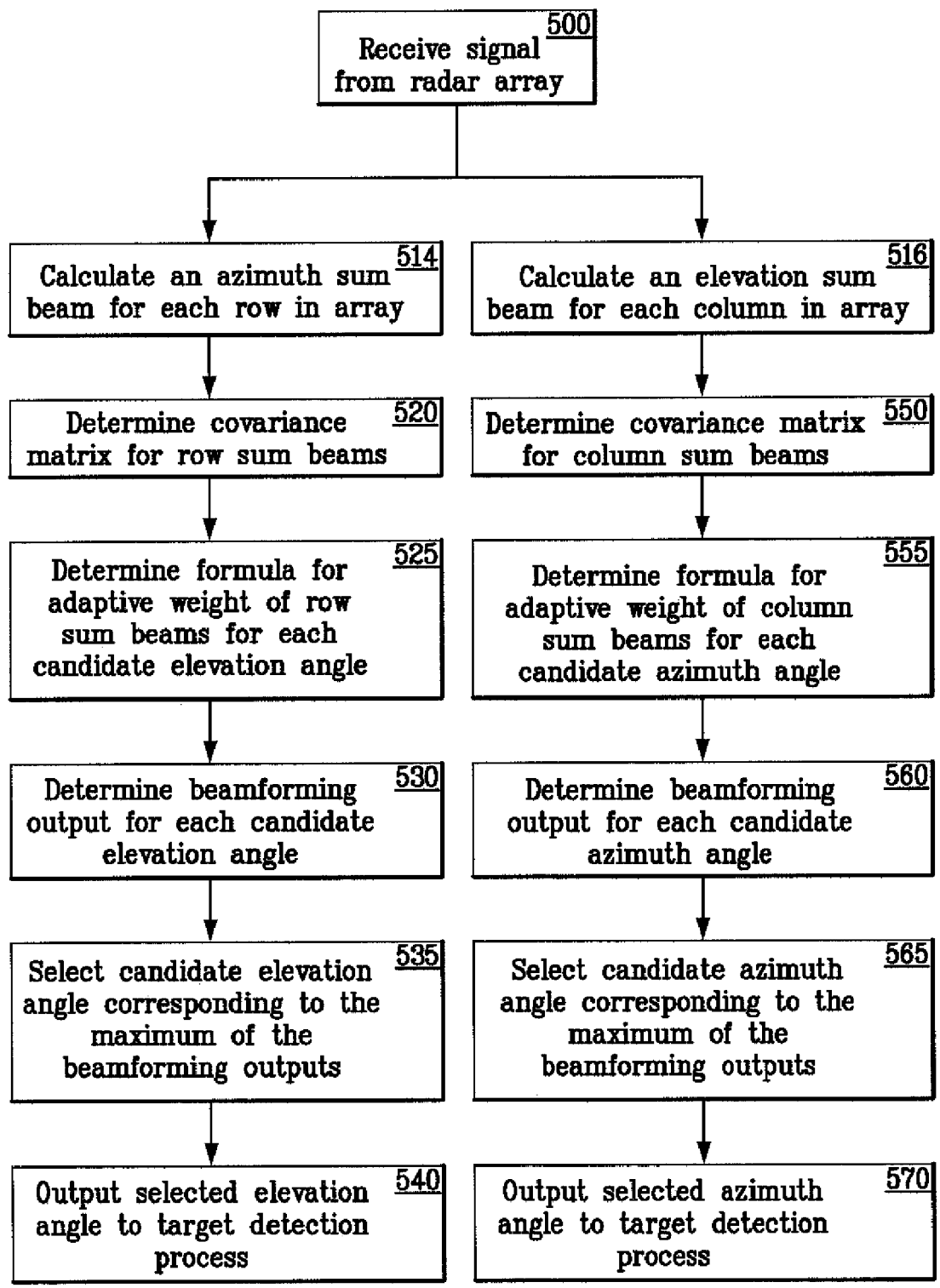
FIG. 5 is a flow diagram showing greater detail in a method of angle estimation in the embodiment of FIG. 1.

In a second process flow, the step of performing deterministic row-based beamforming on the received signal, indicated at block 16 of FIG. 1, may include calculating an azimuth sum beam for each of the columns in the array, as indicated at block 516 of FIG. 5. The step of maximum likelihood estimation, block 20 of FIG. 1, may include the follow steps. A covariance matrix may be calculated for each column sum beam, as indicated at block 550 of FIG. 5. Based on the covariance matrix, a formula may be determined for the adaptive weight of the column sum beams for each candidate azimuth angle, as indicated at block 555 of FIG. 5. Using this formula, the beamforming output may be determined for each candidate azimuth angle, as indicated at block 560. The candidate azimuth angle corresponding to the maximum beamforming output is then selected, as indicated at block 565. As indicated at block 570, the selected azimuth angle is then output to target detection process 24 of FIG. 1.

In the process of target detection, illustrated as block 24 of FIG. 1, the azimuth sum beam and elevation sum beam can be combined for improved target detection leading to improved detectability compared to that which can be achieved by use of either of the azimuth sum beam alone or elevation sum beam alone. The detection scheme is given by $$\max\{r_{\Sigma_A}(t), r_{\Sigma_E}(t)\} \geq \text{Threshold} \Rightarrow \text{Detection}$$

Thus, at a time t when the maximum of the azimuth sum beam and the maximum of the elevation sum beam exceed a selected threshold value, a target has been detected. The selection of the threshold value may be accomplished based on false alarm control by those of ordinary skill in the art.

Figure 3:
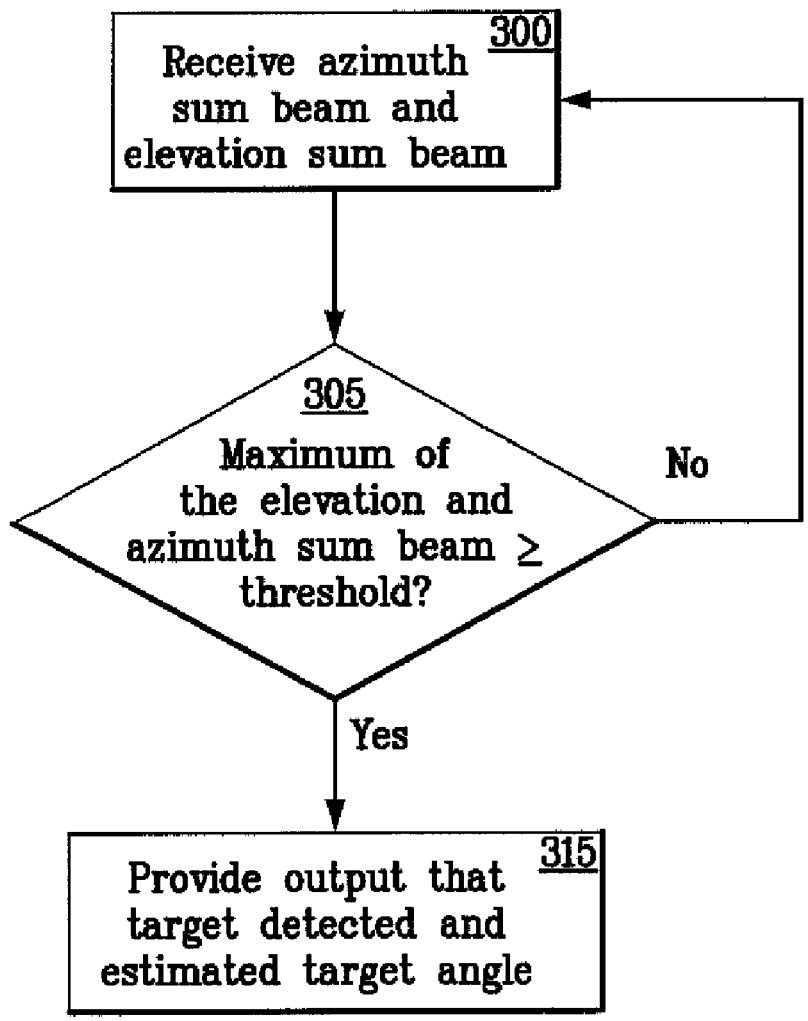
FIG. 3 is a flow diagram showing greater detail of the step of target detection in the embodiment of FIG. 1.

This detection scheme may be represented by the flow diagram of FIG. 3. The process flow commences with receiving the azimuth sum beam and the elevation sum beam, for a given time t, indicated at block 300. The maximum of the elevation sum beam and azimuth sum beam is compared to the threshold, as indicated at block 305. If the maximum of the azimuth sum beam and elevation sum beam for the time is at least the threshold value, then a target has been detected, and the process flow proceeds to providing an output in the form of an indication of target detection and the estimated target angle, as indicated at block 315. If the maximum of the azimuth sum beam and elevation sum beam for the time is less than the threshold value, then the process flow proceeds to receiving the azimuth sum beam and elevation sum beam for the next time value.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

Figure 6:
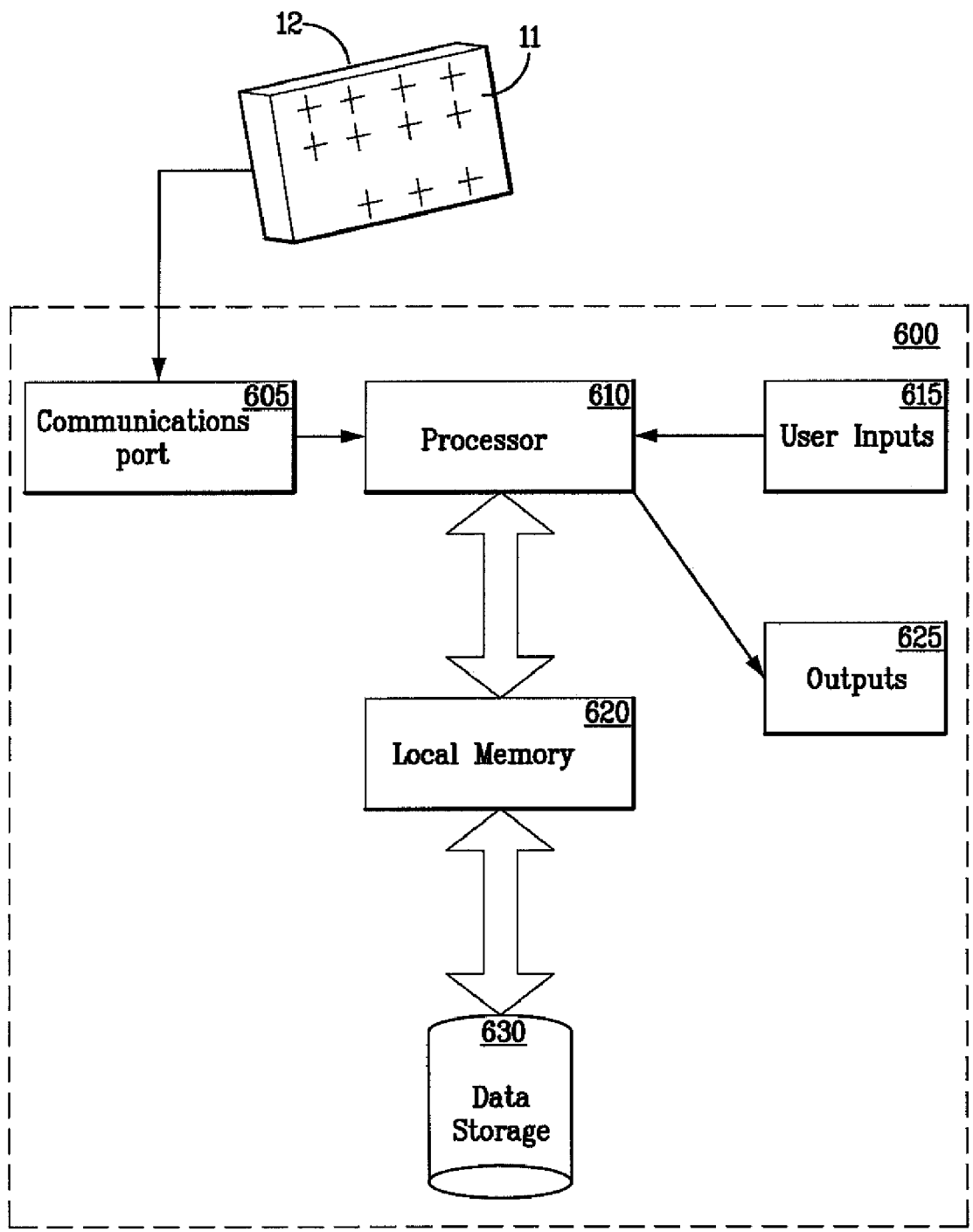
FIG. 6 is a block diagram showing a radar array in data communication with a computer system in accordance with an implementation of the invention.

Referring to FIG. 6, an exemplary system in accordance with an embodiment of the invention is illustrated. Antenna 12 and array 11 are illustrated, as in FIG. 1. Data is communicated from array 11 to computer system 600. In particular, data is received at communications port 605. Communications port 605 furnishes data to processor 610, which executes instructions contained in programs. Local memory 620 is configured to exchange data with processor 610, and may store programs containing processor-executable instructions, and values of variables for use by such programs. Data storage 630 may include a wide variety of data acquired and processed in accordance with the invention. User input may be provided at inputs 615, which may include keyboards, mice and touchscreens. Outputs 625 may include displays as well as printers.

A system in accordance with the invention may include the following means, each of which may be implemented by processor 610 executing instructions contained in programs which may be stored in a storage medium, such as local memory 620. A system in accordance with the invention may include: means for performing deterministic row-based beamforming on the received signal to obtain row sum azimuth beams; means for performing deterministic column-based beamforming on the received signal to obtain column sum elevation beams; means for performing one-dimensional maximum likelihood estimation on the row sum azimuth beams to obtain an estimated target elevation angle and an adaptive array sum azimuth beam; means for performing one-dimensional maximum likelihood estimation on the column sum elevation beams to obtain an estimated target azimuth angle and an adaptive array sum elevation beam; and means for performing target detection based on the adaptive array sum azimuth beam and the adaptive array sum elevation beam. The means for target detection may include means for comparing the maximum of the adaptive array sum elevation beam and the adaptive array sum azimuth beam to a threshold.

The means for performing deterministic row-based beamforming on the received signal may include means for calculating an azimuth sum beam for each of the rows in the array. The means for performing deterministic column beamforming may include means for calculating an elevation sum beam for each of the columns in the array. The means for performing one-dimensional maximum likelihood estimation on the sum azimuth beams may include means for using adaptive weights in calculating beamforming outputs corresponding to candidate elevation angles, and means for selecting the one of the candidate elevation angles corresponding to the maximum of the beamforming outputs. The means for performing one-dimensional maximum likelihood estimation on the sum elevation beams may include means for using adaptive weights in calculating beamforming outputs corresponding to candidate azimuth angles, and means for selecting the one of the candidate azimuth angles corresponding to the maximum of the beamforming outputs.

It will be appreciated that any of the steps in the methods in accordance with the invention described herein may be so implemented.

Exemplary advantages of a method in accordance with the present invention include the following. One advantage is that the use of deterministic row-based beamforming and deterministic column-based beamforming permits processing in one dimension, in each of two dimensions, as compared to processing in two dimensions as required by prior art maximum likelihood estimation techniques, thereby reducing the computational complexity. For example, the beamforming requirements are reduced from the product of the number of rows and columns in the array to the sum of the number of rows and columns in the array. A further advantage is that both multiple mainlobe and multiple sidelobe jammers may be canceled. A further advantage is that the use of maximum likelihood estimation is preferable to monopulse processing in optimizing angle estimation and jammer cancellation simultaneously. The adaptive processing step may be constrained to maintain boresight gain and the sidelobe structure and to be closed to the quiescent beam. The method also combines the azimuth sum beam and the elevation sum beam for improved detection. In the presence of one or more jammers, the elevation sum beam has a horizontal null for each jammer along the azimuth, and the azimuth sum beam has a vertical null for each jammer along the elevation. Thus using the maximum of the azimuth sum beam and the elevation sum beam outputs for detection achieves a pin-hole effect at the jammer location. Target detectability is maintained for the entire beam except at the jammer location which is the intersection of the horizontal and vertical nulls. A further advantage is that prior knowledge of jammer locations is not required.

While the foregoing invention has been described with reference to the above-described embodiment, various modifications and changes can be made without departing from the spirit of the invention. Accordingly, all such modifications and changes are considered to be within the scope of the appended claims.

What is claimed is:

1. A method for radar target detection and angle estimation in the presence of jamming, comprising the steps of:
   receiving a signal from a radar array having elements arranged in a plurality of rows and a plurality of columns;
   performing deterministic row-based beamforming on said received signal to obtain row sum azimuth beams;
   performing deterministic column-based beamforming on said received signal to obtain column sum elevation beams;
   performing one-dimensional maximum likelihood estimation on said row sum azimuth beams to obtain an estimated target elevation angle and an adaptive array sum azimuth beam;
   performing one-dimensional maximum likelihood estimation on said column sum elevation beams to obtain an estimated target azimuth angle and an adaptive array sum elevation beam; and
   performing target detection based on said adaptive array sum azimuth beam and said adaptive array sum elevation beam.

2. The method of claim 1, wherein the step of target detection comprises comparing the maximum of the adaptive sum elevation beam and the adaptive sum azimuth beam to a threshold.

3. The method of claim 1, wherein said step of performing deterministic row-based beamforming on said received signal comprises calculating an azimuth sum beam for each of the rows in the array.

4. The method of claim 1, wherein said step of performing deterministic column-based beamforming comprises calculating an elevation sum beam for each of the columns in the array.

5. The method of claim 1, wherein said step of performing one-dimensional maximum likelihood estimation on said row sum azimuth beams comprises using adaptive weights in calculating a plurality of beamforming outputs corresponding to a plurality of candidate elevation angles, and selecting the one of said candidate elevation angles corresponding to the maximum of said beamforming outputs.

6. The method of claim 1, wherein said step of performing one-dimensional maximum likelihood estimation on said column sum elevation beams comprises using adaptive weights in calculating a plurality of beamforming outputs corresponding to a plurality of candidate azimuth angles, and selecting the one of said candidate azimuth angles corresponding to the maximum of said beamforming outputs.

7. A system for radar target detection and angle estimation in the presence of jamming, comprising:
   means for performing deterministic row-based beamforming on said received signal to obtain row sum azimuth beams;
   means for performing deterministic column-based beamforming on said received signal to obtain column sum elevation beams;
   means for performing one-dimensional maximum likelihood estimation on said sum azimuth beams to obtain an estimated target elevation angle and an adaptive array sum azimuth beam;
   means for performing one-dimensional maximum likelihood estimation on said sum elevation beams to obtain an estimated target azimuth angle and an adaptive array sum elevation beam; and
   means for performing target detection based on said adaptive array sum azimuth beam and said adaptive array sum elevation beam.

8. The system of claim 7, wherein said means for target detection comprises means for comparing the maximum of the adaptive array sum elevation beam and the adaptive array sum azimuth beam to a threshold.

9. The system of claim 7, wherein said means for performing deterministic row-based beamforming on said received signal comprises means for calculating an azimuth sum beam for each of the rows in the array.

10. The system of claim 7, wherein said means for performing deterministic column beamforming comprises means for calculating an elevation sum beam for each of the columns in the array.

11. The system of claim 7, wherein said means for performing one-dimensional maximum likelihood estimation on said sum azimuth beams comprises: means for using adaptive weights in calculating a plurality of beamforming outputs corresponding to a plurality of candidate elevation angles, and means for selecting the one of said candidate elevation angles corresponding to the maximum of said beamforming outputs.

12. The system of claim 7, wherein said means for performing one-dimensional maximum likelihood estimation on said sum elevation beams comprises means for using adaptive weights in calculating a plurality of beamforming outputs corresponding to a plurality of candidate azimuth angles, and means for selecting the one of said candidate azimuth angles corresponding to the maximum of said beamforming outputs.

13. A computer-readable medium having stored thereon a plurality of instructions, the plurality of instructions including instructions which, when executed by a processor, cause the processor to implement a method for radar target detection and angle estimation in the presence of jamming, the method comprising the steps of:
   receiving a signal from a radar array having elements arranged in a plurality of rows and a plurality of columns;
   performing deterministic row-based beamforming on said received signal to obtain row sum azimuth beams;
   performing deterministic column-based beamforming on said received signal to obtain column sum elevation beams;
   performing one-dimensional maximum likelihood estimation on said row sum azimuth beams to obtain an estimated target elevation angle and an adaptive array sum azimuth beam;
   performing one-dimensional maximum likelihood estimation on said column sum elevation beams to obtain an estimated target azimuth angle and an adaptive array sum elevation beam; and
   performing target detection based on said adaptive array sum azimuth beam and said adaptive array sum elevation beam.

14. The computer-readable medium of claim 13, wherein the step of target detection comprises comparing the maximum of the adaptive array sum elevation beam and the adaptive array sum azimuth beam to a threshold.

15. The computer-readable medium of claim 13, wherein said step of performing deterministic row-based beamforming on said received signal comprises calculating an azimuth sum beam for each of the rows in the array.

16. The computer-readable medium of claim 13, wherein said step of performing deterministic column beamforming comprises calculating an elevation sum beam for each of the columns in the array.

17. The computer-readable medium of claim 13, wherein said step of performing one-dimensional maximum likelihood estimation on said sum azimuth beams comprises using adaptive weights in calculating a plurality of beamforming outputs corresponding to a plurality of candidate elevation angles, and selecting the one of said candidate elevation angles corresponding to the maximum of said beamforming outputs.

18. The computer-readable medium of claim 13, wherein said step of performing one-dimensional maximum likelihood estimation on said sum elevation beams comprises using adaptive weights in calculating a plurality of beamforming outputs corresponding to a plurality of candidate azimuth angles, and selecting the one of said candidate azimuth angles corresponding to the maximum of said beamforming outputs.

* * * * *